United States Patent [19]
Hoshino et al.

[11] Patent Number: 5,752,388
[45] Date of Patent: May 19, 1998

[54] ABSORPTION TYPE REFRIGERATING APPARATUS

[75] Inventors: Toshiyuki Hoshino; Masayuki Oonou, both of Gunma-ken, Japan

[73] Assignee: Sanyo Electric Co., Ltd., Osaka-fu, Japan

[21] Appl. No.: 701,374

[22] Filed: Aug. 30, 1996

[30] Foreign Application Priority Data

Aug. 31, 1995 [JP] Japan ................. 7-245220

[51] Int. Cl.$^6$ ................. F25B 15/00; G01K 13/00
[52] U.S. Cl. ................. 62/141; 62/129
[58] Field of Search ................. 62/476, 104, 141, 62/142, 148, 126, 125, 129

[56] References Cited

U.S. PATENT DOCUMENTS 3,626,711  12/1971  Porter et al. ................. 62/141

FOREIGN PATENT DOCUMENTS 251058    10/1990  Japan ................. 62/483
403129262  6/1991  Japan ................. 62/142
613941     2/1994  Japan .
406159853  6/1994  Japan ................. 62/129

Primary Examiner—William Doerrler
Attorney, Agent, or Firm—Weingarten, Schurgin, Gagnebin & Hayes LLP

[57] ABSTRACT

An absorption type refrigerating apparatus using high temperature fluid as heat source of the regenerator is provided to prevent to avoid any possible crystallization of the solution in the high temperature regenerator and that of the solution in the heat exchanger when it starts to operate as well as the problem of abnormally high temperature in the that forces the refrigerating apparatus to stop in emergency. Said absorption type refrigerating apparatus comprises alarm means for notifying an abnormal condition by producing alarm sound or light, temperature detection means for detecting the temperature of the regenerator when the refrigerating apparatus is out of operation and a control unit for operating said alarm means according to the temperature detected by said temperature detection means.

3 Claims, 2 Drawing Sheets

ABSORPTION TYPE REFRIGERATING APPARATUS

BACKGROUND OF THE INVENTION

1. Field of the Invention

This invention relates to an absorption type refrigerating apparatus and, more particularly, it relates to an improvement to the technology of effectively preventing troubles from occurring when the operation of an absorption type refrigerating apparatus using high temperature fluid as heat source is brought to a halt.

2. Background Art

A popular known technique for preventing troubles from occurring when the operation of an absorption type refrigerating apparatus is brought to a halt consists in continuing only the operation of the absorption liquid pump of the refrigerating apparatus for a predetermined period of time (e.g., 10 minutes) to unify the concentration of the absorption liquid and prevent crystallization that may appear when the temperature of the highly concentrated absorption liquid produced by evaporating and separating the refrigerant in the regenerator falls if the operation of the absorption liquid pump of the refrigerating apparatus abruptly stops.

Another popular known technique consists in reducing the concentration of absorption liquid by transferring refrigerant (liquid) to the absorption liquid during the concentration reducing operation of the pump to achieve a concentration of absorption liquid that is sufficiently low to prevent crystallization of the absorption liquid if the temperature of the liquid falls below the expected lowest level (typically about 0° C.).

However, the above technique of lowering the concentration of absorption liquid to such a degree that crystallization of absorption liquid may not appear if the temperature of the absorption liquid falls below the expected lowest level can result in a waste of energy when the temperature would not fall to such an extent as in summer or as in the case where the operation of the refrigerating apparatus is resumed in a short time. In an attempt to avoid such waste of energy, Japanese Patent Publication No. 6-13941 discloses an absorption type refrigerating apparatus comprising means for monitoring crystalline deposition in absorption liquid by detecting the concentration and the temperature of the absorption liquid at any time including the time when stopping the liquid cycle, means for diluting the absorption liquid to a predetermined concentration according to the detection signal provided by said monitoring means, said diluting means including a refrigerant storage tank disposed downstream relative to the condenser and above the evaporator, a pipe conduit connecting the surface of the liquid in the tank and the evaporator and another pipe conduit connecting the bottom of the tank and a point immediately upstream relative to the absorption liquid pump by way of a valve.

However, with an absorption type refrigerating apparatus provided with any of the above described anti-crystallization arrangements, crystallization of absorption liquid can nevertheless occur in the regenerator when the cut-off valve or the control valve gets faulty and high temperature fluid is allowed to flow into the regenerator without being noticed to consequently raise the temperature of the regenerator and accelerate the evaporation of refrigerant. If such is the case, the concentration of the absorption liquid may eventually become too high to give rise to crystallization of absorption liquid within the regenerator or within the heat-exchanger when the refrigerating apparatus is restarted and the refrigerating apparatus may be forced to stop its operation immediately after a start due to abnormal high temperature of the regenerator.

SUMMARY OF THE INVENTION

According to a first aspect of the invention, the above technological problems are solved by providing an absorption type refrigerating apparatus using high temperature fluid as heat source of a regenerator and comprising alarm means for notifying an abnormal condition by producing alarm sound or light, temperature detection means for detecting the temperature of the regenerator when the refrigerating apparatus is out of operation and a control unit for operating said alarm means according to the temperature detected by said temperature detection means.

According to a second aspect of the invention, there is provided an absorption type refrigerating apparatus using high temperature fluid as heat source of a regenerator with an absorption liquid pump arranged on an absorption liquid flow path between an absorber and the regenerator, said refrigerating apparatus comprising temperature detection means for detecting the temperature of the regenerator when the refrigerating apparatus is out of operation and a control unit for starting the operation of said absorption liquid pump according to the temperature detected by said temperature detection means.

According to a third aspect of the invention, there is provided an absorption type refrigerating apparatus using high temperature fluid as heat source of a regenerator with an absorption liquid pump arranged on an absorption liquid flow path between an absorber and the regenerator, said refrigerating apparatus comprising alarm means for notifying an abnormal condition by producing alarm sound or light, temperature detection means for detecting the temperature of the regenerator when the refrigerating apparatus is out of operation and a control unit for operating said alarm means according to the temperature detected by said temperature detection means and starting the operation of said absorption liquid pump simultaneously with immediately after the operation of said alarm means.

DETAILED DESCRIPTION OF THE PREFERRED EMBODIMENTS

Now, the present invention will be described in greater detail by referring to the accompanying drawings that illustrate a preferred embodiment of the invention.

Figure 1:
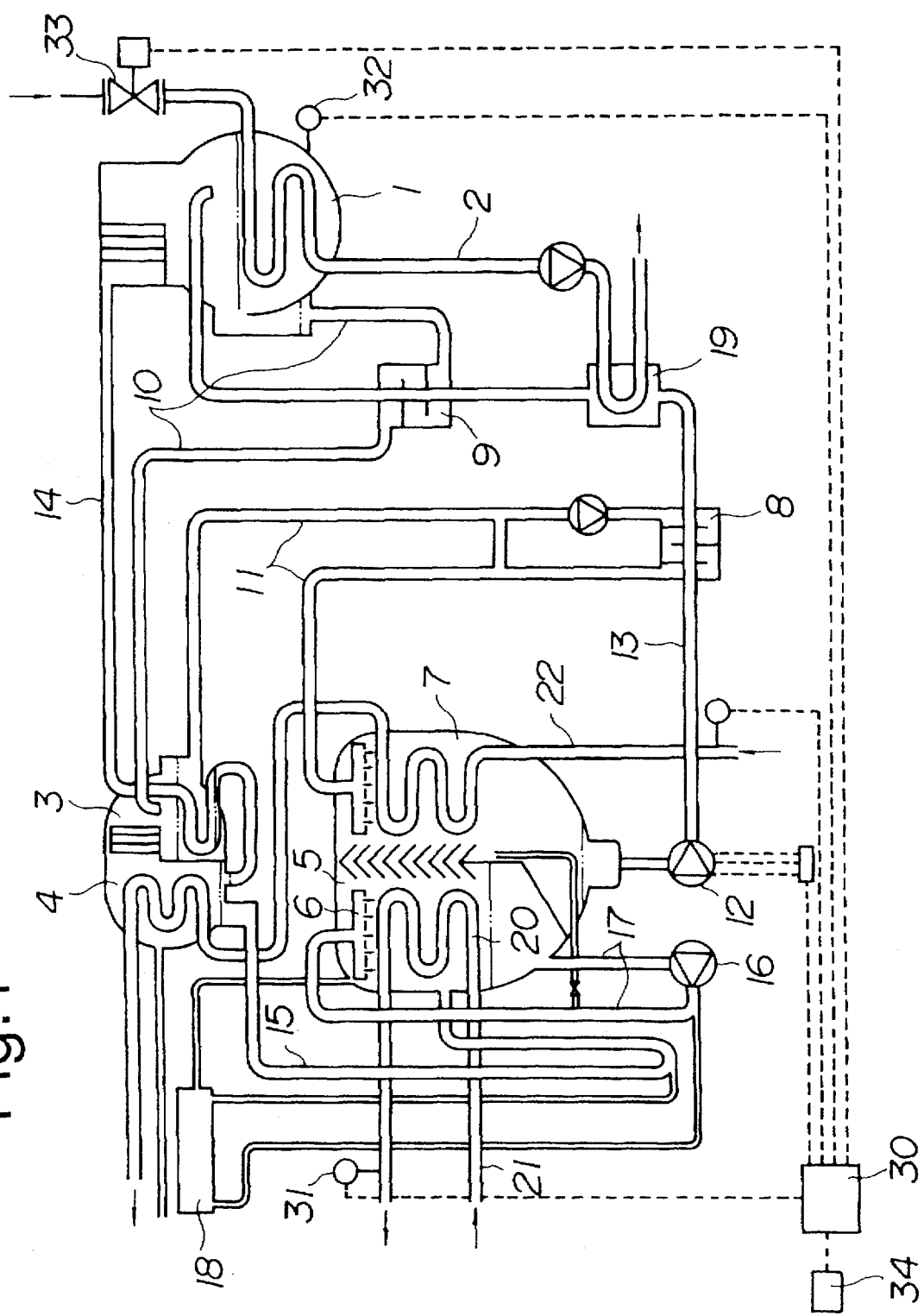
FIG. 1 is a schematic block diagram of a preferred embodiment of the invention.

FIG. 1 is a block diagram of a duplex type absorption type refrigerating apparatus utilizing water as a refrigerant and a lithium bromide solution as absorption liquid (solution). It comprises a high temperature regenerator 1 having a heat source fluid feed pipe 2 for feeding heat source fluid (e.g., high temperature and high pressure steam, hot water or the like) therethrough and designed to condense intermediary absorption liquid (hereinafter referred to as intermediary liquid) by heating dilute absorption liquid (hereinafter referred to as dilute liquid) to produce vapor of the refrigerant, a low temperature regenerator 3 for producing dense absorption liquid (hereinafter referred to as dense liquid) by heating said intermediary liquid by said refrigerant vapor, a condenser 4 for condensing the refrigerant vapor fed from said low temperature regenerator 3, an evaporator 5 for evaporating the refrigerant liquid by spraying and/or dropping it from one or more than one refrigerant sprayers 6 it contains, an absorber 7 for causing the dense liquid fed from said low temperature regenerator 3 to absorb the refrigerant vapor flowing from the evaporator 5 in order to maintain the inside under low pressure, a low temperature heat exchanger 8 and a high temperature heat exchanger 9, which are connected appropriately by intermediary liquid pipes 10, dense liquid pipes 11, dilute liquid pipes 13 provided with an absorption liquid pump 12 for flowing absorption liquid, a refrigerant conduit 14, a refrigerant liquid pipe 15 and refrigerant circulation pipes 17 provided with a refrigerant pump 16 to form a main circulation route for the refrigerant and the absorption liquid. Additionally, there are provided a refrigerant tank 18 and a heat collector 19 linked with each other in a manner as illustrated in FIG. 1 so that the cold water cooled by the latent heat that is produced by the evaporation of the refrigerant due to the heat transmitted through the wall of a heat transmission pipe 20 arranged inside said evaporator 5 operates as a cooling load of an internal heat exchanger (not shown) as it is circulated by way of cold water pipes 21. Reference numeral 22 in FIG. 1 denotes a cooling water pipe arranged through the absorber 7 and the condenser 4. The above arrangement of the components itself is well known.

Reference numeral 30 denotes a control unit having a volume control function that controls the flow rate of the heat source fluid flowing into the high temperature regenerator 1 by controlling the aperture of the control valve 33 according to the temperature detected by a temperature sensor 31 arranged at the outlet side of the cold water pipe 21 of the evaporator 5 in a known manner in order to maintain the temperature of the cold water at the outlet of the evaporator to a predetermined level, e.g., 7° C. The control unit 30 also operates monitoring the temperature of the solution in the high temperature regenerator 1 by observing the output of a temperature sensor 32 arranged within the high temperature regenerator 1 even when the refrigerating apparatus is out of operation and, has a function for operating alarm means 34 to notify the abnormal condition by producing alarm sound or light when the temperature exceeds a predetermined level, and a function for starting the dead absorption liquid pump 12 to restart its operation.

Figure 2:
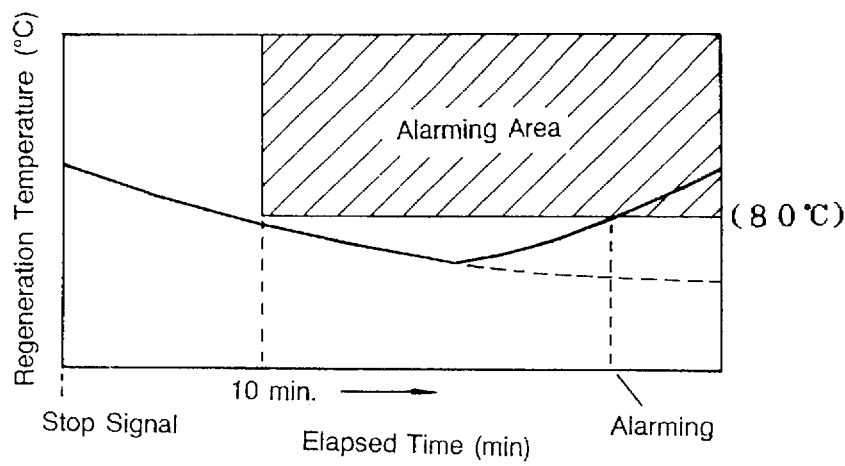
FIG. 2 is a graph showing a possible operation of the control unit of the embodiment.

More specifically, the control unit 30 comprises a storage area (not shown) for storing the readings of the temperature sensor 32 when the absorption type refrigerating apparatus is out of operation and causes both the alarm means 34 and the absorption liquid pump 12 to operate when the readings are found in the hatched area of FIG. 2.

Still more specifically, it starts the temperature sensor 32 to measure the temperature of the solution in the high temperature regenerator 1 when a predetermined period of time, e.g., 10 minutes, has elapsed after the reception of an operation stop signal (signal representing the dead state after halting a diluting operation) and, if the temperature is above a given level, e.g., 80° C., it causes both the alarm means 34 and the absorption liquid pump 12 to operate.

Thus, the control unit 30 having a configuration as described above causes the alarm means 34 to notify the air conditioning operator of an abnormal condition once the temperature sensor 32 detects that the temperature of the solution in the high temperature regenerator 1 rises into the hatched area of FIG. 2 as heat source fluid flows into the high temperature regenerator 1 due to a faulty condition of the control valve 33 while the refrigerating apparatus is out of operation. At the same time, it starts the absorption liquid pump 12 to circulate solution to automatically block any possible rise in the concentration of the solution in the high temperature regenerator 1 to consequently prevent the solution from crystallizing in the high temperature regenerator 1 and/or in the heat exchanger when it starts to operate. Thus, the problem of known absorption type refrigerating apparatuses that they have to stop in emergency when the temperature of the high temperature regenerator abnormally rises is completely dissolved.

Figure 3:
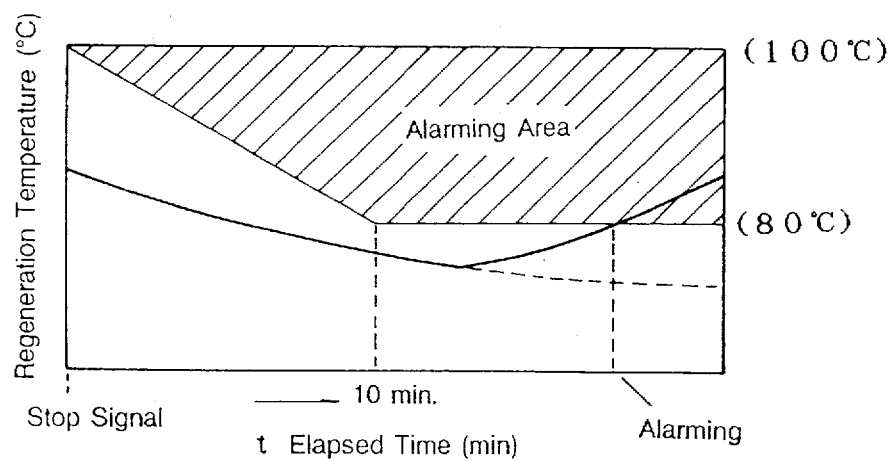
FIG. 3 is a graph showing another possible operation of the control unit of the embodiment.

A temperature range as shown in FIG. 3 may alternatively be selected for the operation of the alarm means 34 and the absorption liquid pump 12. In this instance, the control unit 30 starts the alarm means 34 and the absorption liquid pump 12 if the temperature of the solution detected by the temperature sensor 32 exceeds $-2t+100$ (°C.) t minutes after a halt of the operation of the refrigerating apparatus until t gets to 10 minutes and, thereafter, if the temperature exceeds 80° C.

When the temperature range of FIG. 3 is used for the operation of the alarm means 34 and the absorption liquid pump 12, the control valve 32 is monitored for abnormal operation immediately after the operation of the refrigerating apparatus comes to a halt to avoid any possible crystallization of the solution in the high temperature regenerator and that of the solution in the heat exchanger when it starts to operate as well as the problem of abnormally high temperature in the that forces the refrigerating apparatus to stop in emergency.

Figure 4:
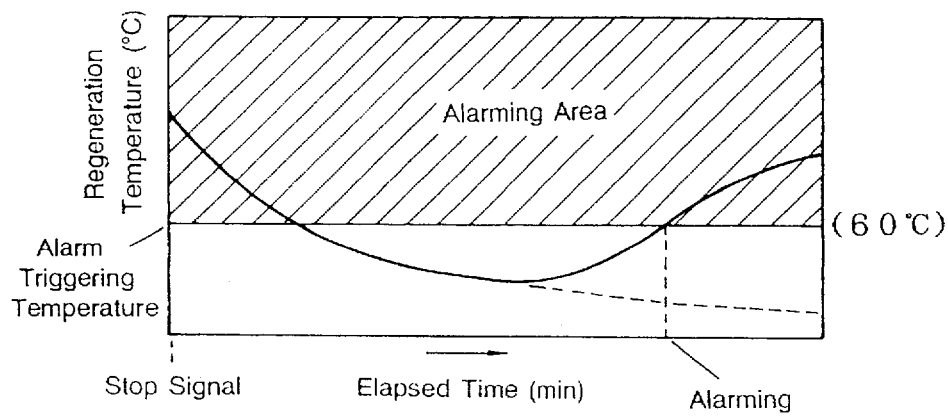
FIG. 4 is a graph showing still another possible operation of the control unit of the embodiment.

Still alternatively, a temperature range as shown in FIG. 4 may be selected. In this instance, the control unit 30 starts the alarm means 34 and the absorption liquid pump 12 when the solution temperature detected by the temperature sensor 32 exceeds 60° C., for example, and the temperature is rising.

With such an arrangement for the control unit 30, the operation of the absorption type refrigerating apparatus is not affected by the external temperature and hence a relatively low temperature range may be selected.

Although the present invention is described above in terms of a preferred embodiment, various modifications and alterations may be made thereto without departing the scope of the invention as defined by the appended claims.

For instance, the control unit 30 may be so arranged that it operates only the alarm means 34 when the solution temperature of the high temperature regenerator 1 detected by the temperature sensor 32 is found within a predetermined temperature range and then starts the operation of the absorption liquid pump 12 after a predetermined period of time, e.g., 30 minutes.

The main body of the absorption type refrigerating apparatus may be of a simplex type.

As described above, according to the invention, there is provided an absorption type refrigerating apparatus using high temperature fluid as heat source of the regenerator and comprising alarm means for notifying an abnormal condition by producing alarm sound or light, temperature detection means for detecting the temperature of the regenerator when the refrigerating apparatus is out of operation and a control unit for operating said alarm means according to the temperature detected by said temperature detection means.

There is also provided an absorption type refrigerating apparatus using high temperature fluid as heat source of the regenerator with an absorption liquid pump arranged on the absorption liquid flow path between the absorber and the regenerator, said refrigerating apparatus comprising temperature detection means for detecting the temperature of the regenerator when the refrigerating apparatus is out of operation and a control unit for starting the operation of said absorption liquid pump according to the temperature detected by said temperature detection means.

There is also provided an absorption type refrigerating apparatus using high temperature fluid as heat source of the regenerator with an absorption liquid pump arranged on the absorption liquid flow path between the absorber and the regenerator, said refrigerating apparatus comprising alarm means for notifying an abnormal condition by producing alarm sound or light, temperature detection means for detecting the temperature of the regenerator when the refrigerating apparatus is out of operation and a control unit for operating said alarm means according to the temperature detected by said temperature detection means and starting the operation of said absorption liquid pump simultaneously or immediately after the operation of said alarm means.

Thus, where alarm means is provided to operate at any required time in an absorption type refrigerating apparatus according to the invention, the air conditioning operator is notified of any abnormal condition so that he can immediately deal with the faulty control valve that feed the regenerator with high temperature fluid.

Where an absorption liquid pump is provided to operate an any required time in an absorption type refrigerating apparatus according to the invention, a diluting operation is started automatically to block an abrupt rise in the concentration of the solution in the regenerator to avoid any possible crystallization of the solution in the high temperature regenerator and that of the solution in the heat exchanger when it starts to operate as well as the problem of abnormally high temperature in the that forces the refrigerating apparatus to stop in emergency.

When both alarm means and an absorption liquid pump are provided, their effects can be obtained simultaneously.

What is claimed is:

1. An absorption type refrigerating apparatus using high temperature fluid as heat source of a regenerator, wherein said absorption type refrigerating apparatus comprises alarm means for notifying an abnormal condition by producing alarm sound or light, temperature detection means for detecting the temperature of the regenerator when the refrigerating apparatus is out of operation and a control unit for operating said alarm means as a function of the time from ceasing operation of said refrigeration apparatus and the temperature detected by said temperature detection means.

2. An absorption type refrigerating apparatus using high temperature fluid as heat source of a regenerator with an absorption liquid pump arranged on an absorption liquid flow path between an absorber and the regenerator, wherein said absorption type refrigerating apparatus comprises temperature detection means for detecting the temperature of the regenerator when the refrigerating apparatus is out of operation and a control unit for starting the operation of said absorption liquid pump as a function of the time from ceasing operation of said refrigeration apparatus and the temperature detected by said temperature detection means.

3. An absorption type refrigerating apparatus using high temperature fluid as heat source of a regenerator with an absorption liquid pump arranged on an absorption liquid flow path between an absorber and the regenerator, wherein said absorption type refrigerating apparatus comprises alarm means for notifying an abnormal condition by producing alarm sound or light, temperature detection means for detecting the temperature of the regenerator when the refrigerating apparatus is out of operation and a control unit for operating said alarm means as a function of the time from ceasing operation of said refrigeration apparatus and the temperature detected by said temperature detection means and starting the operation of said absorption liquid pump simultaneously or immediately after the operation of said alarm means.

* * * * *